United States Patent [19]
Wass

[11] Patent Number: 5,839,220
[45] Date of Patent: Nov. 24, 1998

[54] COLLAPSIBLE MARINE ANIMAL TRAP AND STORAGE UNIT

[76] Inventor: Eric C. Wass, 18 Hall's La., Rockland, Me. 04841

[21] Appl. No.: 706,299

[22] Filed: Aug. 30, 1996

Related U.S. Application Data

[63] Continuation-in-part of Ser. No. 271,425, Jul. 7, 1994, abandoned.

[51] Int. Cl.$^6$ ................................................ A01K 69/10
[52] U.S. Cl. .................................. 43/105; 43/100; 43/104
[58] Field of Search ............................. 43/100, 102, 103, 43/104, 105

[56] References Cited

U.S. PATENT DOCUMENTS

| | | | |
|---|---|---|---|
| 2,516,658 | 7/1950 | Stelly | 43/100 |
| 2,760,297 | 8/1956 | Buyken | 43/105 |
| 3,245,173 | 4/1966 | Sylvester . | |
| 3,319,373 | 5/1967 | Gale | 43/100 |
| 3,795,073 | 3/1974 | Olsen | 43/105 |
| 3,821,861 | 7/1974 | Jalbert | 43/100 |
| 4,030,232 | 6/1977 | Niva . | |
| 4,509,288 | 4/1985 | Shepherd . | |
| 4,604,823 | 8/1986 | Ponzo | 43/105 |
| 4,648,199 | 3/1987 | Deaton et al. | 43/100 |
| 4,730,411 | 3/1988 | Katis | 43/105 |
| 4,864,770 | 9/1989 | Serio . | |
| 4,887,382 | 12/1989 | Moritz | 43/102 |
| 4,897,953 | 2/1990 | Bruce | 43/100 |
| 4,982,525 | 1/1991 | Miller . | |

FOREIGN PATENT DOCUMENTS

| | | | |
|---|---|---|---|
| 2691612 | 12/1993 | France | 43/100 |

Primary Examiner—Joseph J. Hail, III
Assistant Examiner—Anthony Ojini
Attorney, Agent, or Firm—Pierce Atwood; Chris A. Caseiro

[57] ABSTRACT

A collapsible lobster trap having an external and internal design very similar to existing, non-collapsible traps, which allows a user to transport by truck, boat, or other means, a larger number of traps per excursion than is currently possible. The trap has a rectangular bottom panel to which a first pair of opposed side panels and a second pair of opposed side panels are hingedly attached. A top panel is hingedly attached to one of the side panels and is secured in the closed position by two retaining straps. In a preferred embodiment of the invention, each panel of one pair of opposed side panels is designed with ends overlapping the ends of the other pair of opposed side panels so that the vertical corners of the trap are structurally reinforced while maintaining collapsibility. The trap has two internal partitions made of a net-like material in the form of a funnel shape with the larger opening of the funnel shape being attached to the bottom and long sides of the trap and the smaller opening of the funnel shape attached to the sides of the trap creating multiple compartments. The long side panels each have an entrance opening also made of similar, net-like material forming a funnel to the inside of the trap. The partitions and the entrance openings are of such a design so as to make it extremely difficult for lobsters to escape. One alternative design of the device includes the removal of internal partitions for smaller-scale versions of the trap, such that the collapsible trap may be used for recreational purposes or for the trapping of other types of marine life. In another version of the device the internal partitions as well as the entryways may be omitted so that a collapsible storage unit is provided to retain relatively large numbers of marine animals.

13 Claims, 6 Drawing Sheets

COLLAPSIBLE MARINE ANIMAL TRAP AND STORAGE UNIT

This application is a CIP of Ser. No. 08/271,425 filed Jul. 7, 1994 now abandoned.

BACKGROUND OF THE INVENTION

1. Field of the Invention

The present invention relates to a collapsible crustacean trap having multiple chambers for trapping more than one crustacean at a time. Particularly, this invention is primarily made for catching lobsters. More particularly, this invention is made for easy assembly and disassembly without the need to store parts of the trap separately. Yet more particularly, the invention is designed to withstand the rigors of lobstering off the coast of the Northeast United States. Most particularly, the present invention is designed to increase lobstering efficiency by permitting the storing and stacking of three times the quantity of traps in a given space as has been hitherto possible and, consequently, allowing the user to triple the number of traps carried per lobstering excursion while achieving the same ruggedness, durability, and dependability offered by standard, conventional traps.

2. Description of the Prior Art

The concept of collapsible crustacean/lobster traps has been around for many years. The key advantage of a collapsible trap is that it permits the user to reduce the trap storage space otherwise needed. Some of the earlier devices using netting and flimsy frames were designed primarily as crab traps for use in shallow coastal waters. Others were designed specifically for catching lobsters and, therefore, for use a greater distance from the shore and at greater depths. The latter traps require greater structural strength to withstand the handling and the environmental conditions above and below the sea. Generally, those collapsible lobster traps are made of numerous and complicated parts.

Some of the more recent collapsible-trap designs provide for a reduction in the required number of parts as well as for an apparent simplification of the structure overall. However, both the earlier devices and some of the recent ones suffer major disadvantages as the result of providing only one chamber for holding the catch and of providing fixed tunnel entrance units—called heads—which must be removed and stored separately. Both features are unacceptable in a trap to be used for fishing in the Northeast. Specifically, a single chamber is undesirable when trying to catch lobsters because the trap is often left in the water for several days. With only one chamber the chance for a lobster to escape is greatly increased. As a result, most, if not all, traps used for lobstering in that part of the country include several chambers so that escape is much less likely. In addition, the use of a plurality of chambers increases the likelihood that greater numbers of lobsters will be retained, as lobsters tend to move from an entry chamber to bait retained in back chambers "deeper" in the trap. With regard to the fixed heads that must be removed and stored separately, such manipulation greatly increases the length of time required to deploy or remove each trap. That cuts into the effective fishing time available and is therefore unacceptable, particularly as fishing time periods are limited by weather, seasons, and regulation.

More recent collapsible traps have been devised in various shapes having pyramidal, circular, octagonal, and rectangular designs. U.S. Pat. No. 4,982,525 (1991, Miller) teaches a collapsible lobster or crab trap having a pyramidal shape with a triangular base and three triangular sides. Miller provides for two net-head entrances and a single-room trap. Its pyramidal shape allows for problem-free trap retrieval upward through kelp or seaweed.

U.S. Pat. No. 4,864,770 (1989, Serio) teaches a collapsible crustacean trap having rectangular top and bottom panels made of wire and hinged to side panels which are, in turn, themselves hinged in the middle. Serio provides for a single room and a single net-head entrance.

U.S. Pat. No. 4,509,288 (1985, Shepherd) teaches a shellfish trap having octagonal top and bottom panels made of wire. Shepherd provides for two rigid wire-mesh entrances for the shellfish with attached wire-mesh doors leading to a single room. Although the Shepherd trap was designed for easy assembly and can be broken down into component parts, the large number of component parts makes it impractical from the user's viewpoint.

U.S. Pat. No. 3,245,173 (1966, Sylvester) teaches a lobster pot made of a lightweight material yet requires relatively little ballast to keep it submerged. Sylvester provides for two recessed but rigid entrances and a single room for holding the catch. Absent from the Sylvester device is a means for preventing the entrapped catch from leaving through the entrance openings.

Even though these previous devices all purport to address the goal of either the collapsibility of the trap or the ease of assembly of the trap, they nevertheless suffer from key disadvantages. All of these previous devices overlook the need for a multi-room trap for accommodating larger numbers of lobster and for increasing the difficulty of escape over a limited period of time. In addition, they do not address the degree of ruggedness required for the trap once it is assembled and in use, taking account of the combined weight of the lobster, the trap, the hauling conditions, and the ballast needed to properly anchor the trap on the ocean floor. All of these deficiencies render those prior traps unacceptable by present lobstermen. Essentially the only type of "new" trap, including the type that is collapsible, that is likely to gain acceptance is the type that looks and operates like currently-available traps. To date, that has not been achieved, particularly in the field of collapsible traps.

Of course, while the present discussion is focused specifically on lobster traps having multiple internal chambers, it is to be understood that on a more general level, the prior devices fail to teach simple and effective means for catching any variety of marine life, including, but not limited to shrimp, crabs, etc., with a trap that is easily collapsible. Moreover, a collapsible unit designed simply to store marine animals including, but not limited to, lobsters and crabs, such as a storage crate, would be an effective device for retaining such animals without the need to waste considerable space warehousing such units.

Therefore, what is needed is a collapsible lobster trap that provides an increase in available storage space and that is easy to set up and to breakdown. What is also needed is a collapsible trap that is a self-contained unit that does not require the storing of separate parts. What is further needed is such a collapsible trap having a structurally rugged design capable of withstanding abuse inflicted by the lobsters, by the handling, and by the ambient conditions above and below the sea. Yet further, what is needed is a collapsible lobster trap that retains the same basic shape and operational characteristics as those traps currently in use, making it more useful and practical from the lobsterman's viewpoint. On a more general level, what is needed is a simple and effective collapsible marine animal trap that may be used for a variety of crustaceans and other sea life in which it is not necessary to include isolated sections within the trap. Finally, what is needed is a simple and effective collapsible marine animal storage unit, such as a crab or lobster crate, that does not require isolated chambers and that may be used to hold many such animals in a single unit.

SUMMARY OF THE INVENTION

It is an object of the present invention to provide a trap that combines collapsibility with the familiarity and ruggedness of existing, non-collapsible lobster traps. It is another object of the present invention to provide such a trap that can be quickly and easily manipulated and that does not require the user to store and combine numerous separate components. It is yet another object of the present invention to provide a collapsible trap that can stand up to the conditions normally experienced by traps used to capture lobsters in the Northeastern United States and similar areas. It is also an object of the present invention to provide a collapsible trap that has the same appearance as those traps currently in use, and with essentially the same structural integrity as such traps. It is a further object of the present invention to provide a collapsible trap that does not require internal chambers for isolating captured marine creatures. Still further, it is an object of the present invention to provide a collapsible storage unit that is easy and simple to assemble and to collapse.

The present invention achieves those and other objectives by providing a collapsible trap having a bottom panel, a top cover panel, and four side panels, two of which are opposite each other and longer than the other two opposing end panels. The four side panels are hingedly connected on their lower ends to the bottom panel of the trap. The top cover panel of the trap is a two-piece, hinged component, being of similar size and shape as the bottom panel, and preferably connected to just one of the side panels. If one set of opposing side panels is longer than the other opposing pair, the top panel is preferably hingedly connected to one of those longer side panels. The top panel, bottom panel, and the side panels are generally made of a mesh-like material. The bottom panel may have two rectangular "runners" attached thereunder to reduce the friction of the trap bottom as the trap is dragged along the ocean floor into position. It is also to be noted that ballast is required to prevent movement of the trap with tide changes. Generally, bricks or concrete slabs are used to provide the proper ballast required and they are normally tied to the bottom panel of the trap. This can be done in the trap of the present invention. In an alternative embodiment of the present invention, ballast is provided by casting a concrete slab directly on a small section of the bottom panel effectively encapsulating the mesh-like material that makes up the various panels of the trap.

When set up, the preferred embodiment of the collapsible crustacean trap of the present invention forms a rectangular box, having three rooms, chambers, or compartments for holding the lobster. Viewing the trap on its long side, it can be seen to include a front section, a middle section, and a back section. The front section has two net-head entrances which are located opposite each other on the longer side panels of the trap. Each of these net heads forms a concave tunnel of netting that ends with an opening located within the front internal compartment of the trap. The net heads give the effect of a funnel leading to bait which is located in the front internal compartment. When the lobster crawls through the net head towards the bait, the lobster falls to the bottom of the trap but is unable to climb back out without considerable effort.

The middle and back sections are formed by the suspension of two successive internal partitions, also called "net heads," that effectively divide the internal space of the trap into separate parts. These internal partitions are made of a net-like material, preferably nylon, are connected to the bottom panel and the two long side panels, and are suspended at the upper ends of the two long side panels using some type of well-known connection means, such as a wire or, preferably, a shock-cord. The first internal net head, which is similar to an internal wall, separates the front section of the trap from the middle section by forming a concave tunnel of netting, similar in design to the entrance net heads, that ends with an opening located within the middle section of the trap. In similar fashion, the second internal net head forms a second wall in the shape of a concave tunnel of netting leading from the middle section to the back section of the trap. The back section has an exit vent designed to allow short, under-sized lobsters a way out of the trap. The internal net heads tend to fool the lobsters, which become trapped within the front section, into believing that these net heads represent a way out. The effect of this design causes the entrapped lobsters to move toward the back section of the trap while emptying the front section, thus, allowing additional lobsters to enter through the entrance net heads in their attempt to get the bait. Consequently, a larger number of lobsters can be caught during the typical turn around cycle for a given trap. In an alternative design of the collapsible lobster trap of the present invention, the unit may be of relatively small size such that only a few lobsters may be held at one time—effectively, a trap for recreational use. For such a lobster trap there would be no need for internal partitions, or "net heads," although the basic arrangement of the collapsible side panels, as well as the top and bottom panels, of the unit would remain the same.

In yet another embodiment of the present invention, the collapsible trap can be used to retain other marine animals, such as crabs and shrimp, with only slight modifications not directed to the basic arrangement of the collapsible panels. Specifically, the internal partitions would be omitted, at least in regard to the shrimp trap and possibly in regard to the crab trap. For the shrimp in particular, netting having smaller openings than those utilized for the lobster and crab traps would be utilized. In addition, a collapsible unit of larger dimensions than those generally contemplated for lobster traps may be used as a marine animal storage unit. Such a storage crate would not require internal partitions, or net heads, but would still have the same collapsibility arrangement of the panels.

The collapsible trap of the present invention is set up in the following way. First, a bait cord, which is used to secure the trap in its folded configuration, is released from the top cover panel. Alternatively, a latch may be formed as a part of the front collapsible panel and designed such that when the top panel is moved away from the front panel it is released from the latch. The top cover is unfolded and the hingedly-attached side panel is lifted away from atop the underlying opposite side panel to its vertical position. With this first side panel in its vertical position, the opposite side panel is lifted away from atop a first end panel and raised to its vertical position. With both long side panels held vertically, the first end panel is lifted to its vertical position away from atop an opposite end panel and positioned between the two long side panels, engaging such side panels forming three sides of a rectangular box representing the overall shape of the trap. The opposite end panel is then lifted away from atop the bottom panel to its vertical position, engaging the long side panels and forming the fourth side of the rectangular box.

During erection of the long side panels, the internal net heads, which are secured to the bottom panel and the two long side panels, form the internal walls of the trap, thereby creating a three-compartment trap. The shock cord, which supports the "top end" of the net head, or some other attachment means, is also connected to the upper ends of the long side panels. The entrance net heads located in the front section are connected to each other by attachment means, again such as a wire or a shock or "bungee" cord, in order to maintain their funnel shape during use. The top cover panel closes over the top of the trap and is secured using securing means, such as two shock cords, one on each end of the rectangular box. These securing shock cords, having each end secured to one of the opposing long side panels and hooks attached to the cords' midsection, are stretched up and over the end panels via the hooks attached to the cords midsection which then engage the top cover panel, securing the cover of the trap. The collapsible trap also has the necessary ballast, in the form of bricks or concrete slabs for holding the trap in place on the ocean floor. The ballast is semi-permanently or permanently secured to the trap so that all of the component parts of the collapsible trap are self-contained within the trap such that no individual components need be stored separately or are likely to be lost.

A key feature of the present invention is the engagement of the side and end panels. The panel engagement of the present invention provides the ability to fold the top, side, and end panels down on to each other to reduce the overall height of the trap. At the same time, the trap is designed so as to maintain structural integrity when fully deployed and under operating conditions. This is achieved in the present invention by offsetting the location of the connection of the end and side panels so that such engagement is not located at the vertical corners of the trap. Instead, the end and side panels are formed to overlap at the corners and beyond those corners where stress on the trap is greatest under typical operating conditions.

The collapsible trap of the present invention provides numerous advantages over those devices found in the prior art, in addition to providing the advantage of increased storage space. One key advantage is that the present invention can be speedily assembled without requiring special skills, agility, or training. Of particular importance is that the trap of the present invention has essentially the same appearance as those traps widely in use in the Northeastern United States. This appearance and the fact that the trap operates in the same manner, when deployed, as current traps increases the likelihood of its acceptance, when compared with prior collapsible traps.

PREFERRED EMBODIMENT

Figure 1:
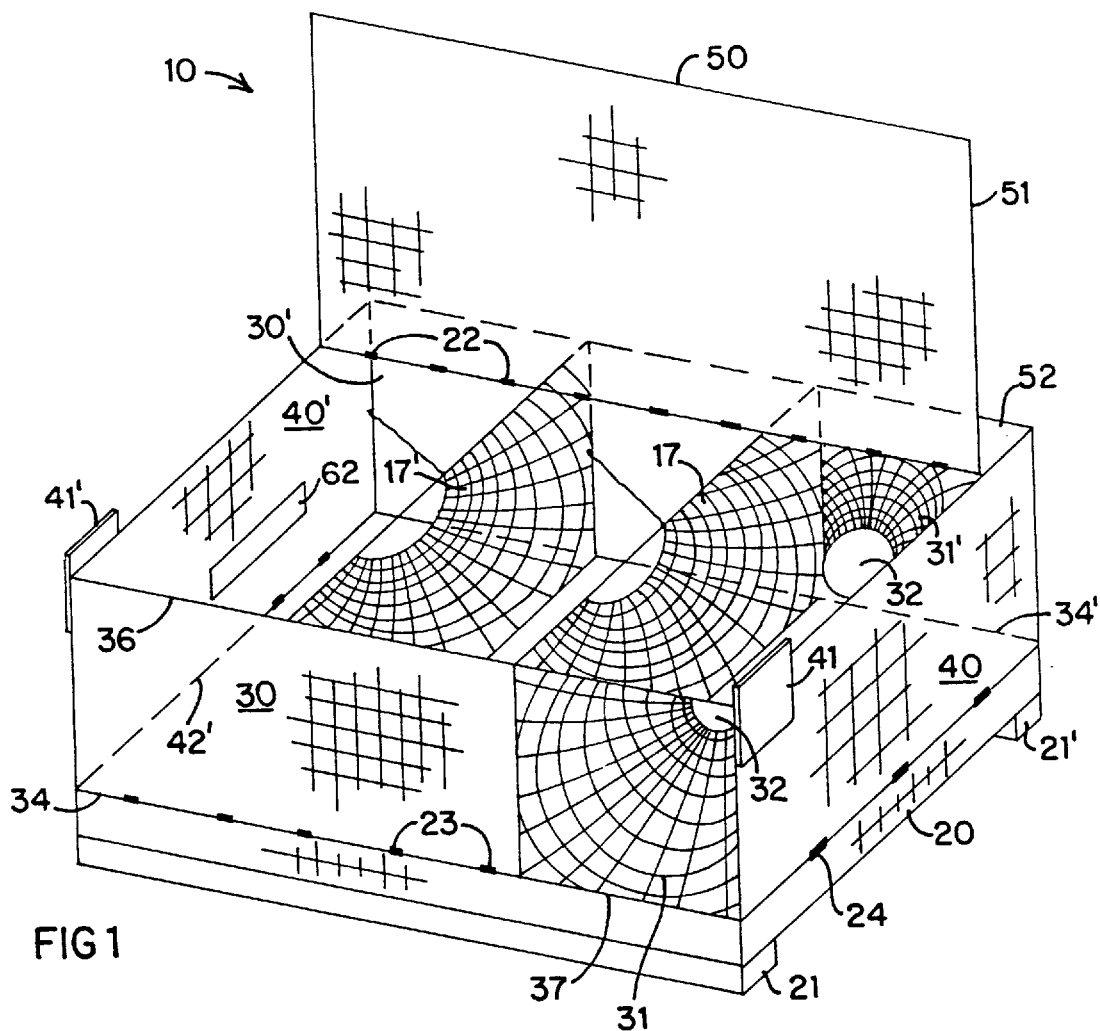
FIG. 1 is a perspective view of the present invention showing the collapsible lobster trap fully assembled with the larger section of the top cover panel open exposing the internal net heads.
Figure 2:
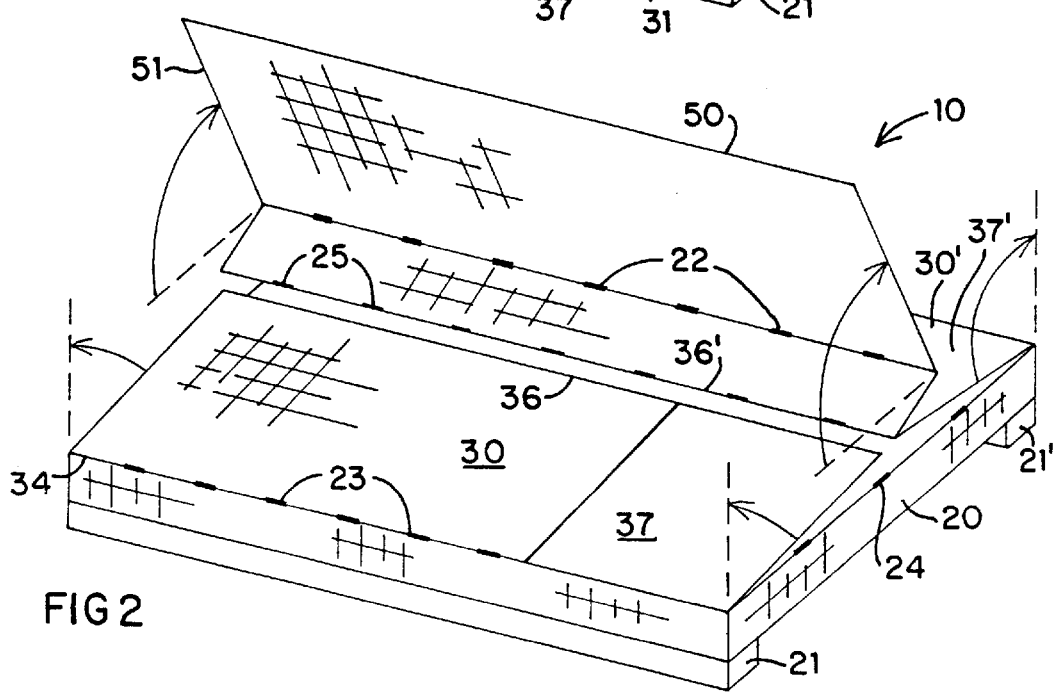
FIG. 2 is a perspective view of the present invention showing a first stage of trap deployment.
Figure 3:
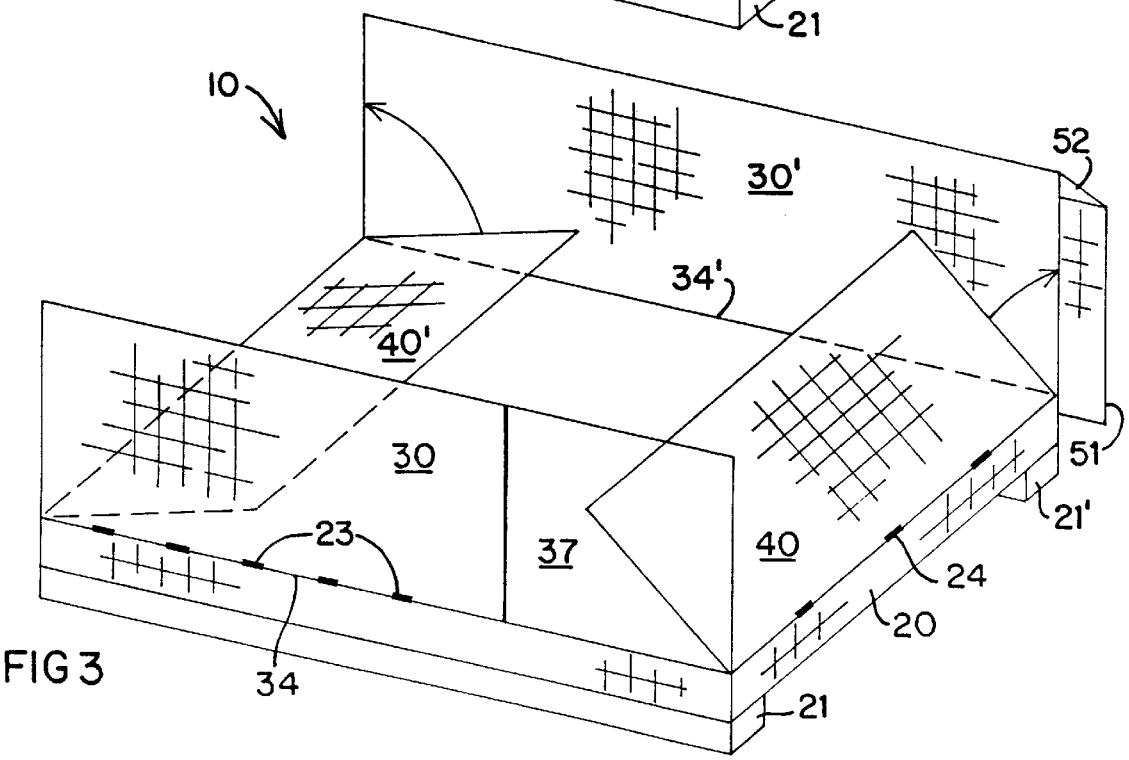
FIG. 3 is a perspective view of the present invention showing a second stage of trap deployment.
Figure 4:
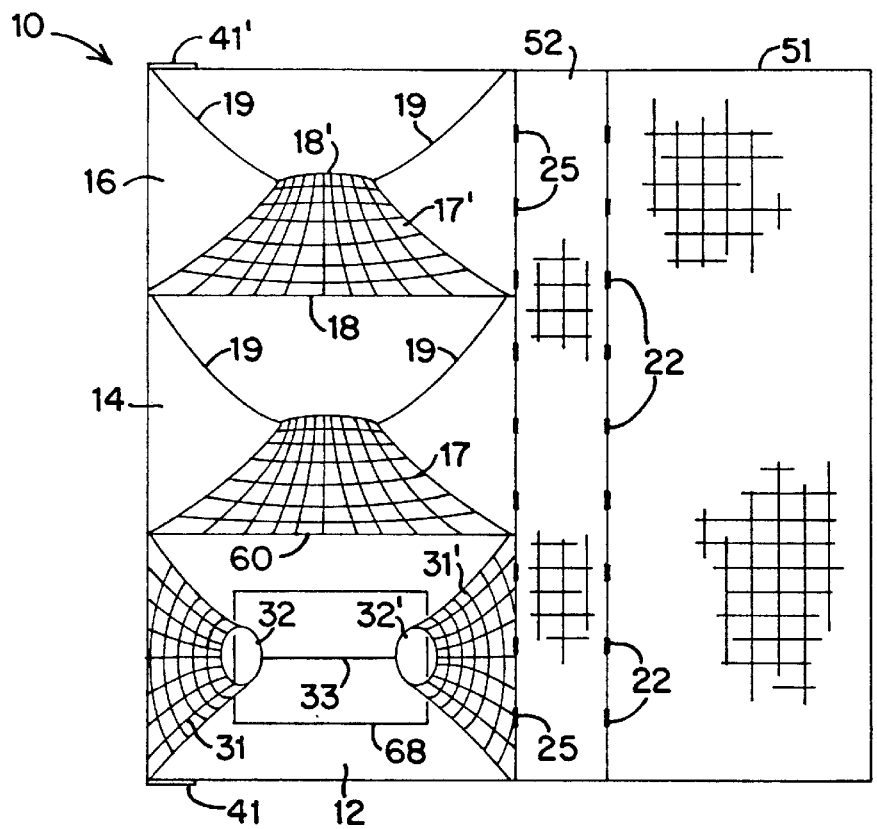
FIG. 4 is a top view of the present invention with the top cover panel completely open showing the arrangement of the net heads and the various compartments.

The general arrangement of the preferred embodiment of the collapsible lobster trap of the present invention is illustrated in FIGS. 1–7. The collapsible lobster trap 10 includes a bottom panel 20, a left side panel 30, a right side panel 30', a front end panel 40, a back end panel 40', and a top cover panel 50. The top panel 50 consists of a larger top section 51 connected by a plurality of top hinge clips 22 to a smaller top section 52. The lobster trap 10, as shown in FIG. 1 and FIG. 4, has an internal configuration made up of a front section 12, a middle section 14 also known as the "first parlor," and a back section 16 also know as the "second parlor" or "bedroom." The three sections 12, 14, and 16 as shown in the drawings, may be of equivalent size or any one section may be larger in dimension than any other section. All panels are preferably made of wire mesh coated with a corrosion-resistant material. While the trap 10 is preferably made of a wire mesh like most lobster traps in use today, it may alternatively be formed of any material generally used for making such devices.

The bottom panel 20 has a left rectangular support runner 21 and a right rectangular support runner 21' attached for support and for ease of moving trap 10 along the ocean floor. A concrete ballast slab 68 is permanently fixed to the bottom panel 20 in the area of the front section 12.

A lower left end 34 of the left side panel 30 and a lower right end 34' of the right side panel 30' are connected to the bottom panel 20 by a plurality of first side hinge clips 23. Similarly, a lower front panel end 42 of the front panel 40 and a lower back panel end 42' of the back panel 40' are also connected to the bottom panel 20 by a plurality of bottom hinge clips 24. An upper right end 36' of the right panel 30' is connected to the smaller top section 52 of the top panel 50 by a plurality of second side hinge clips 25. Both the left panel 30 and the right panel 30' have a front end section 37 and 37', respectively. Attached to the front end section 37 of the left panel 30 is a first net head 31 with a funnel-shaped design having an entrance opening 32 at its distal end. Similarly, attached to the front end section 37' of right panel 30' is a second net head 31' of like design having an entrance opening 32' at its distal end. Net head 31 and net head 31' are connected to each other at openings 32 and 32' by a shock cord 33. A third net head 17 and a fourth net head 17' are of similar manufacture with a funnel-shaped design, each having a wider first end opening 18 and a narrower second end opening 18'. The first end opening 18 of the third net head 17 is attached to the bottom panel 20, the left panel 30, the right panel 30', and a shock cord 60 connected between upper left end 36 and the upper right end 36' of left panel 30 and right panel 30', respectively, forming a first internal "wall." The first end opening 18 of the fourth net head 17' is attached to the bottom panel 20, the left panel 30, the right panel 30', and a shock cord 60' connected between the upper left end 36 and the upper right end 36' of left panel 30 and right panel 30', respectively, forming a second internal "wall." The third net head 17 separates the front section 12 from the middle section 14, and the fourth net head 17' separates the middle section 14 from the back section 16. To maintain the funnel shape of the third and fourth net heads 17 and 17', a plurality of cords 19 are attached to the second end opening 18' of each of the net heads 17 and 17', and are tautly secured to the left panel 30 and the right panel 30'.

Figure 5:
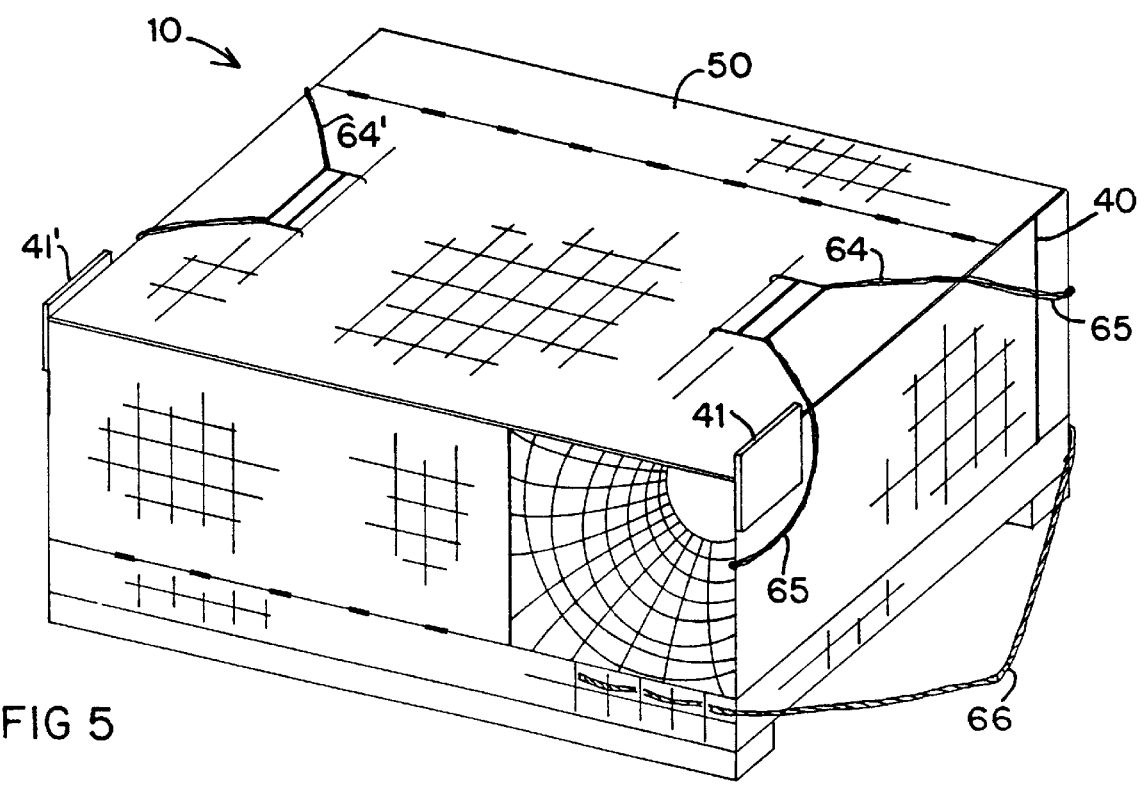
FIG. 5 is a perspective view of the present invention showing the completely-deployed collapsible lobster trap with top cover secured.

The front panel 40 preferably has a top cover stop 41, and the back panel 40' has a top cover stop 41' to prevent the top panel 50 from moving side to side causing additional stress to the structural strength of trap 10. FIG. 1 and FIG. 5 show the relative position of the top cover stops 41 and 41'. FIG. 5 further shows shock-cord retaining straps 64 and 64' engaging and securing the top panel 50 of trap 10 as well as a hauling harness 66. A first retaining strap end 65 and a second retaining strap end 65' of the retaining straps 64 and 64' are each affixed to the left and right panels 30 and 30', respectively.

Figure 6:
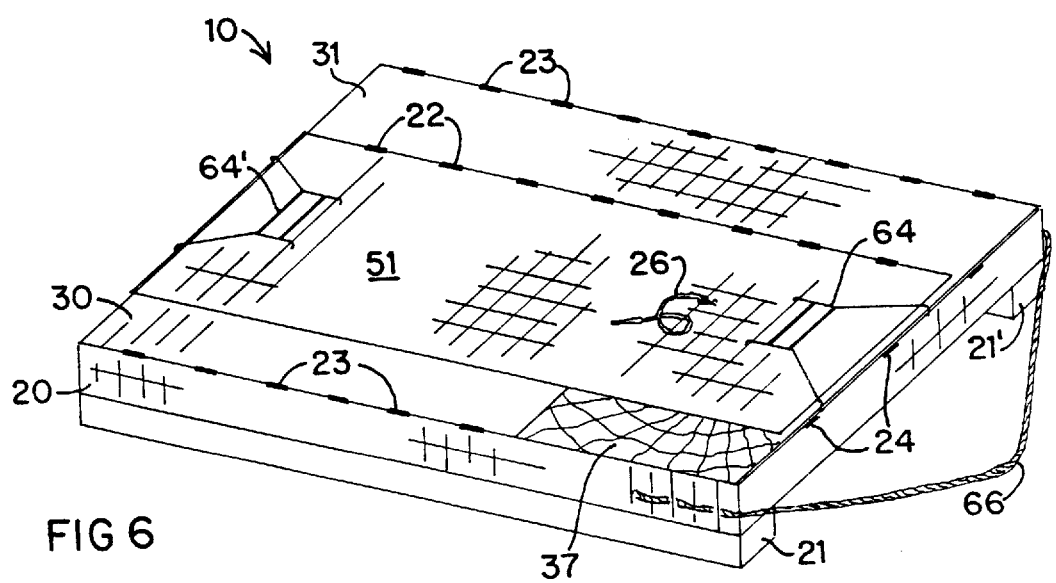
FIG. 6 is a perspective view of the present invention showing the collapsible lobster trap in its collapsed configuration.

The collapsible lobster trap 10 is deployed for use in the following manner. FIG. 6 shows the trap 10 collapsed in its stored configuration with the bait cord 27 and the shock-cord retaining straps 64 and 64' securing the front panel 40, the back panel 40', the left panel 30, the right panel 30', and the top panel 50 to the bottom panel 20 for ease of handling the trap 10. FIG. 2 shows the trap 10 in the process of being deployed. Once the bait cord 26 is released, the top panel 50 is lifted and the right panel 30' is erected to the vertical position. The left panel 30 is then similarly lifted to its vertical position. Turning now to FIG. 3, both the left panel 30 and the right panel 30' are held in their vertical positions while the front panel 40 followed by the back panel 40' are erected to their vertical positions engaging both the left and right side panels 30 and 30', respectively.

Figure 1A:
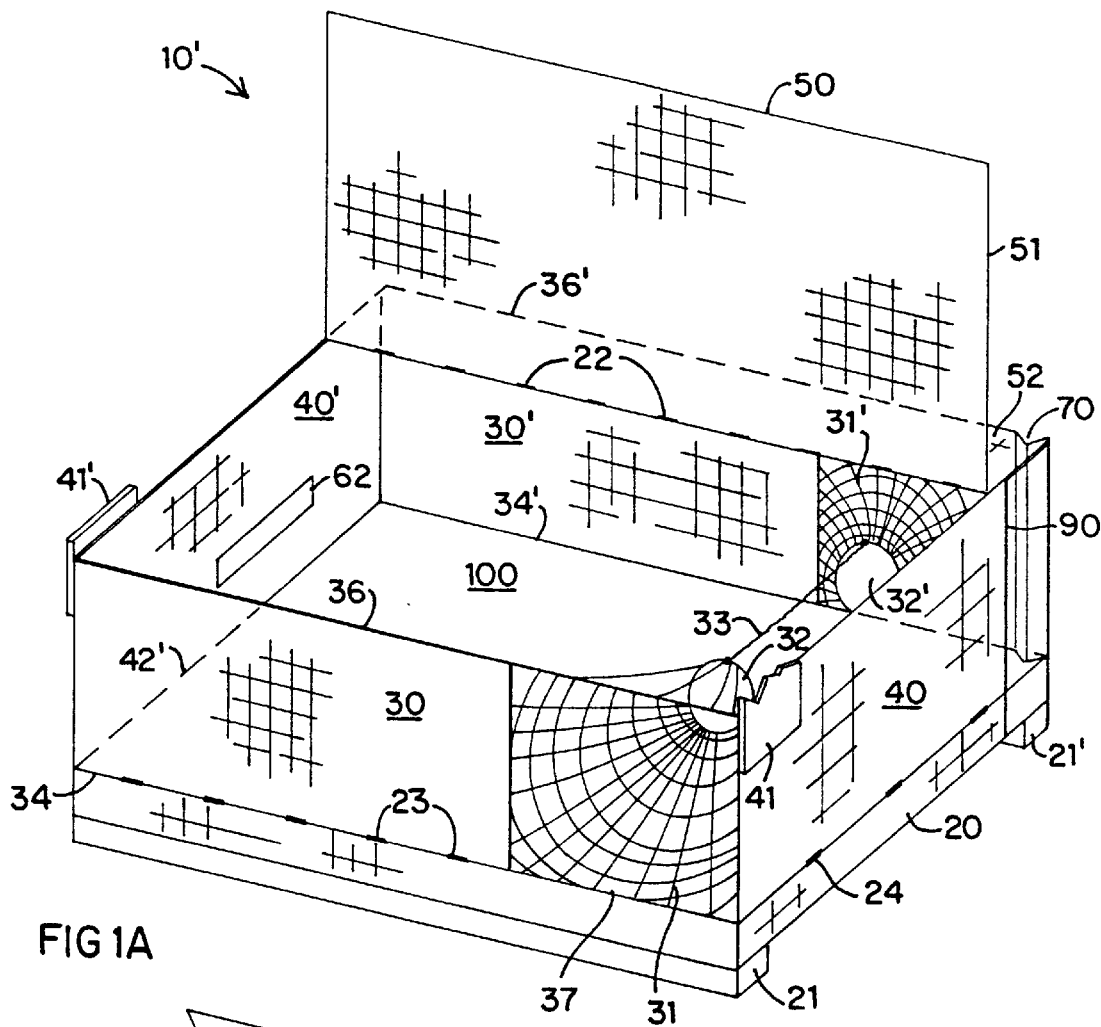
FIG. 1A is a perspective view of an alternative collapsible trap design without internal partitions.
Figure 4A:
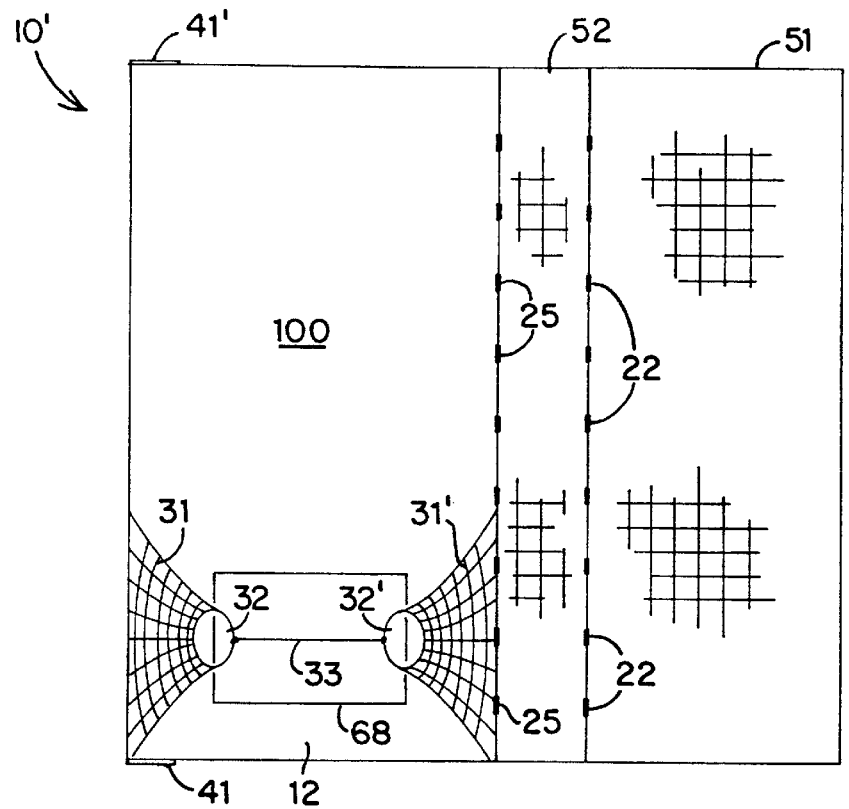
FIG. 4A is a top view of the alternative collapsible trap design of FIG. 1A, showing net-head entrances but without internal net heads.

In an alternative design of the collapsible device of the present invention a trap 10' shown in FIGS. 1A and 4A is designed as a smaller version of the lobster trap 10 without the internal net heads. This smaller version is shown to have essentially the same components as those described in reference to FIGS. 1 and 4, where like components are identified by like numbering in the drawings. This smaller version may be used to catch a smaller number of lobsters, or to catch crabs, over a shorter period of time. Alternatively, supplemental webbing of a porosity smaller than that of the wire mesh used to form the panels, may be attached to that wire mesh so as to permit the capture of smaller marine animals, including, but not limited to shrimp. Collapsible trap 10' includes net heads 31 and 31' in order to permit a marine animal to enter a retention area 100. Those entry heads are designed as previously noted so as to prevent the marine animals from easily exiting via the openings 32 and 32'. The panels of the trap 10' are designed in the same manner utilized in forming the panels of lobster trap 10 in the manner to be described more fully herein.

Figure 1B:
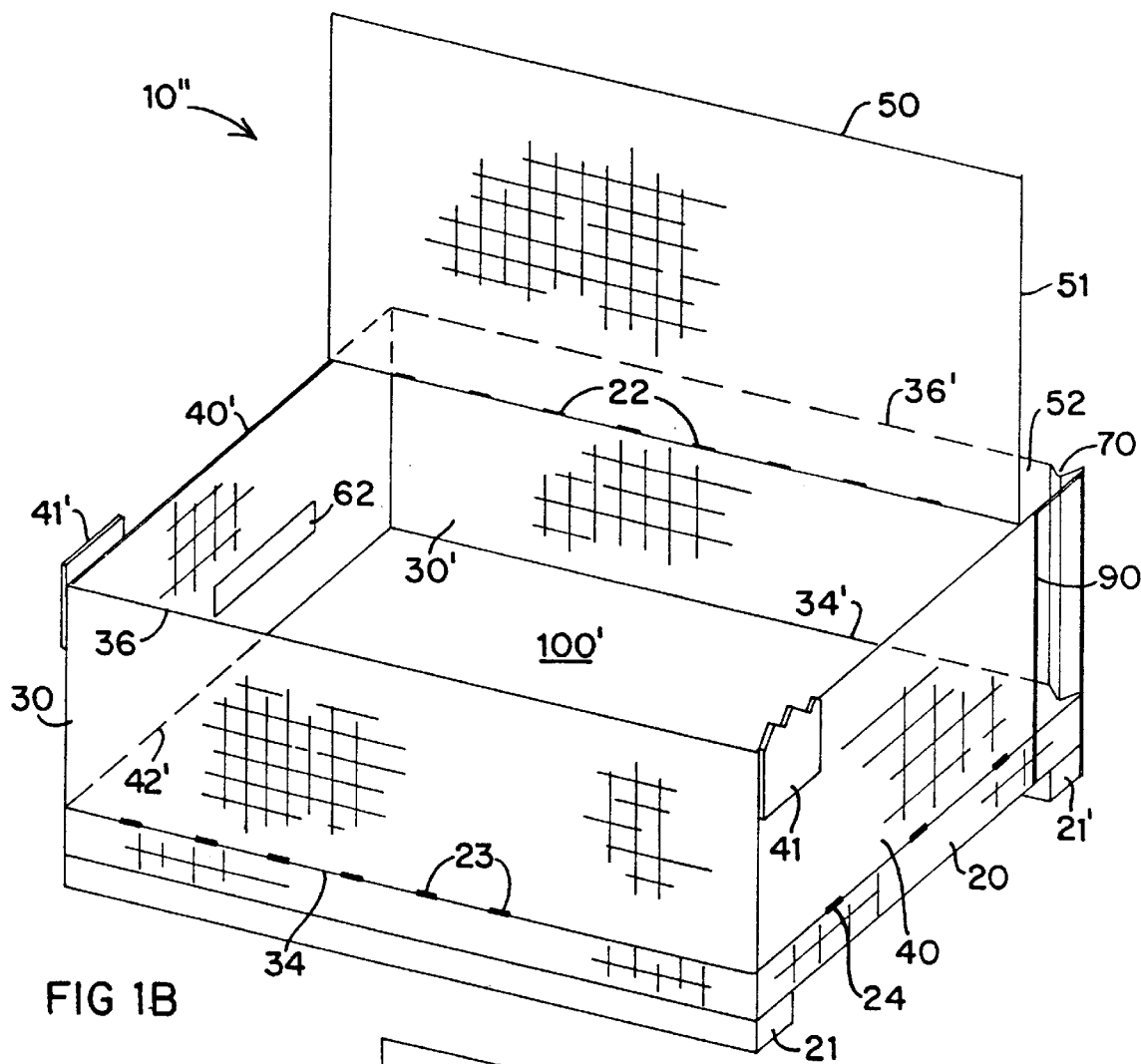
FIG. 1B is a perspective view of a collapsible marine animal storage unit of the present invention, without internal partitions and without net-head entrances.
Figure 4B:
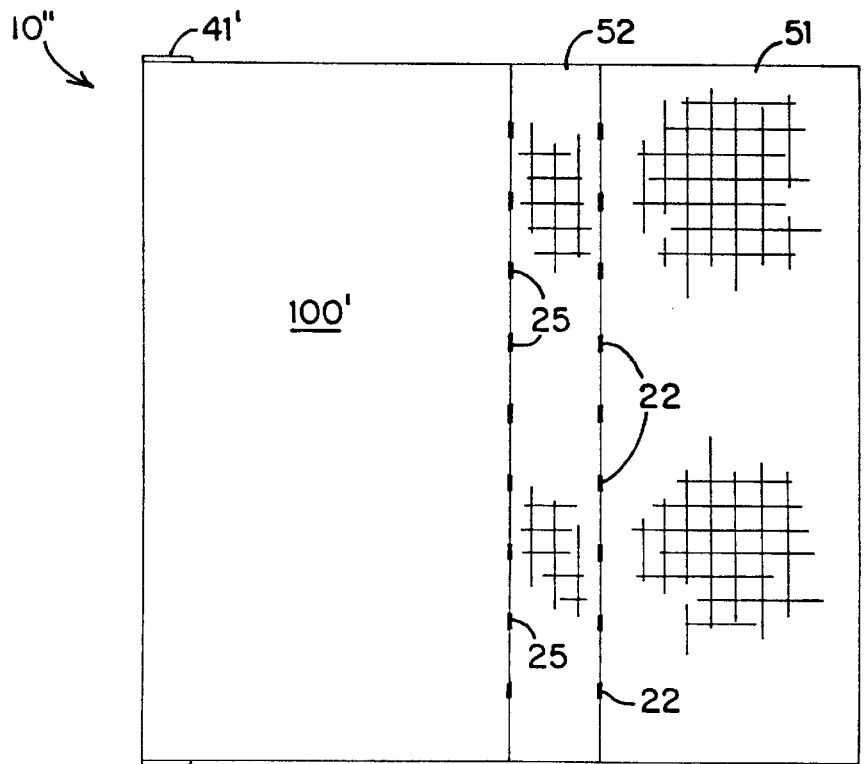
FIG. 4B is a top view of the collapsible marine animal storage unit of FIG. 1B, showing the collapsible device without internal or entry net heads.

In another variation of the lobster trap 10 shown in FIGS. 1 and 4, a collapsible storage unit 10" illustrated in FIGS. 1B and 4B, is designed to retain marine animals rather than to capture them. The storage unit 10" or crate is collapsible in the same manner that traps 10 and 10' in that the panels are collapsingly engageable in the manner noted herein. However, the storage unit 10" does not include any net heads. That is, there are no internal net heads for making separate chambers, nor are there any entry net heads through which lobsters, crabs, etc., may escape. A storage area 100' is designed to keep the marine animals within the storage unit 10" after they have been placed within the unit 10" and the top panel 50 has been secured closed. While a cord may be used to secure the top panel 50 to the left panel 30, any suitable closing means may be used, including, but not limited to, a latch designed to fit tightly between two wire sections forming the wire mesh.

Figure 7:
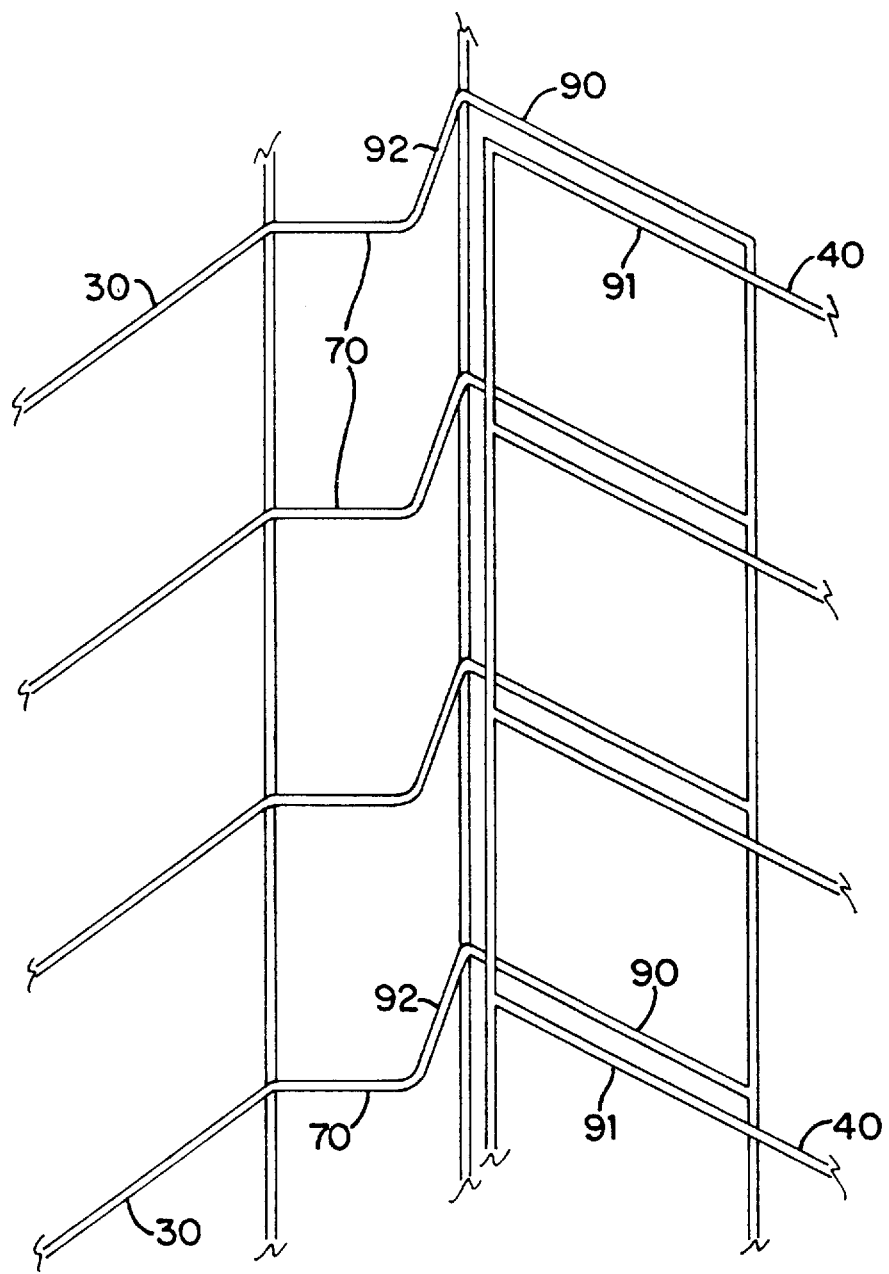
FIG. 7 is an enlarged perspective view showing the engaging mechanism of an end of the side panel with an end of the front panel of the present invention in its deployed position, separated so as to clearly show the preferred design.

As shown in FIG. 1, a key feature of the present invention is the means for engaging end and side panels together so that collapsibility is achieved while structural integrity is maintained. An overlap 90 wraps around the front panel 40. An engaging bend 70 captures an end 91 of the front panel 40. FIG. 7 shows a close-up of an interfacing of an end 92 of right panel 30' and the end 91 of the front panel 40, the ends of those two panels overlap. In order to enhance the structural integrity of the trap 10 and that panel interface, end 91 of the front panel 40 is captured within end 92 of right panel 30'. The engaging bend 70 provides the means for this panel capturing. Of course, this enhancement also strengthens the connection of the two panels shown. It is to be understood that the remaining three vertical corners of the trap 10 are similarly designed for the same purpose. Even though FIG. 7 shows the preferred embodiment of the corner connections, a multi-piece corner can also be constructed to effect the desired result. A separate, corner section sporting the engaging bend and end of the preferred embodiment may be fabricated and then affixed to the ends of the side panels using clamps, wire, rope, or any other known attaching means.

Continuing with the discussion of the set up of the trap 10, with the shock cords 60 and 60', the first end opening 18 of the third and fourth net heads 17 and 17', and the cords 19 are already affixed to the trap 10, sections 12, 14, and 16 are automatically formed when the trap 10 is erected. To create the funnel shape of the first and second net heads 31 and 31', the shock cord 33, which is secured to entrance opening 32, is connected to entrance opening 32'. The shock cord 33 is of sufficient length to maintain proper tension between the first and second net heads 31 and 31' causing them to retain the funnel shape during use. To complete the set up, bait is attached to the bait cord 26 and the top panel 50 is closed, resting between the top cover stops 41 and 41'. The shock-cord retaining straps 64 and 64' are stretched up and over the front and back panels 40 and 40', respectively, and hooked to the top panel 50 thus securing the deployed trap 10. The trap 10 is dropped overboard into the ocean in a desired location and is then retrieved from its location on the ocean floor by the hauling harness 66.

When the trap 10 is deployed on the sea bottom, a lobster entering the trap 10 through either entrance opening 32 or entrance opening 32', would fall to the bottom panel 20. The third net head 17 and the fourth net head 17' are incorporated into the trap 10 to fool a lobster into believing that openings 18 and 18' are a means of escape from the trap 10. As a lobster moves from the front section 12 to the middle section 14 via net head 17, and then from the middle section 14 to the back section 16 via net head 17', it encounters an exit vent 62 which is incorporated into the structure of the back panel 40'. The exit vent 62 is provided in the back panel 40' and is of a particular size to allow undersized lobsters to escape yet entrap the remaining lobsters. Because the length of time between excursions by the lobstermen to check the traps can be rather long, the use of multiple chambers/rooms in the trap 10 decreases the likelihood that any entrapped lobsters other than undersized ones would escape.

Although the preferred embodiment of the present invention has been described in some detail herein, it is to be understood that this description is merely illustrative. The inventive apparatus may be modified in a variety of ways to suit a particular purpose while still employing the unique concepts set forth in the SUMMARY.

What is claimed is:

1. A collapsible lobster trap comprising:
   a. a bottom panel;
   b. a plurality of side panels comprising a first pair of opposed side panels and a second pair of opposed side panels, each of said plurality of side panels being connected at a lower end thereof to said bottom panel, and said first pair of opposed side panels having engagement means detachably connecting said first pair of opposed side panels to said second pair of opposed side panels, wherein said engagement means includes a capturing bend on a first end and a capturing bend on a second end of each of said first pair of opposed side panels, wherein said capturing bend on said first end engages one end of one of said second pair of opposed side panels and said capturing bend on said second end engages one end of the other of said second pair of opposed side panels;
   c. a top panel having one top panel side hingedly attached to an upper end of one of said plurality of side panels;
   d. means for securing said first pair of opposed side panels to said top panel; and
   e. at least one collapsible internal partition affixed to said bottom panel and to said first pair of opposed side panels forming multiple chambers therein.

2. The collapsible lobster trap as claimed in claim 1 wherein said bottom panel has two rectangular support elements affixed thereto.

3. The collapsible lobster trap as claimed in claim 2 wherein said bottom panel has a hauling harness affixed thereto.

4. The collapsible lobster trap as claimed in claim 1 wherein said collapsible internal partition is made of flexible reticulate material.

5. The collapsible lobster trap as claimed in claim 4 wherein said internal partition is funnel-shaped, having a larger-end-opening affixed directly to said bottom panel, to said first pair of opposed side panels, and to a suspended shock-cord secured between said first pair of opposed side panels, and wherein said internal partition has a smaller-end-opening secured to said first pair of opposed side panels by a plurality of cords.

6. The collapsible lobster trap as claimed in claim 1 wherein said top panel is a two-pieced component having a first larger component rotatably attached to a second smaller component by a plurality of hinges, said second smaller component being hingedly attached to one of said first pair of opposed side panels.

7. The collapsible lobster trap as claimed in claim 1 wherein said top panel, said plurality of side panels, and said bottom panel, are made of wire mesh.

8. The collapsible lobster trap as claimed in claim 7 wherein said bottom panel has a concrete ballast slab permanently affixed thereto.

9. The collapsible lobster trap as claimed in claim 1 wherein each of said second pair of opposed side panels has a top cover stop permanently affixed thereto.

10. The collapsible lobster trap as claimed in claim 1 having a bait cord within said trap for securing bait.

11. The collapsible lobster trap as claimed in claim 1 wherein each of said first pair of opposed side panels has an entrance opening.

12. The collapsible lobster trap as claimed in claim 11 wherein said entrance openings of said first pair of opposed side panels are opposite each other and are connected to each other by a shock-cord.

13. A collapsible lobster trap comprising:
   a. a substantially rectangular bottom having a concrete ballast slab permanently affixed thereto; said bottom also having a hauling harness and two rectangular support elements affixed thereto;
   b. a plurality of side panels consisting of a first pair of opposed side panels and a second pair of opposed side panels, each of said plurality of side panels being connected at a lower end thereof to said bottom panel, each of said second pair of opposed side panels having a top cover stop permanently affixed thereto, and each of said short side panels engaging a formed bend on a front end and a back end of each of said first pair of opposed side panels, each of said first pair of opposed side panels having an entrance opening wherein said entrance openings are opposite each other and said entrance openings are made of a flexible, reticulate material, connected to each other by a shock-cord at distal ends thereof;
   c. a top panel being a two-pieced component having a first larger component rotatably attached to a second smaller component by a plurality of hinges, said second smaller component being hingedly attached to one of said first pair of opposed side panels;
   d. an internal compartment having at least one internal partition forming multiple chambers therein, wherein said internal partition is made of flexible reticulate material having a larger end opening affixed directly to said bottom panel, to each of said first pair of opposed side panels, and to a suspended shock-cord secured between said first pair of opposed side panels, and wherein said internal partition has a smaller end opening secured to said first pair of opposed side panels by a plurality of cords; and
   e. securing means affixed to said ends of said first pair of opposed side panels for holding said top panel to said plurality of side panels.

* * * * *